(12) United States Patent
Gobelt et al.

(10) Patent No.: US 7,230,051 B2
(45) Date of Patent: Jun. 12, 2007

(54) USE OF POLYACRYLATE-MODIFIED POLYSILOXANES AS LEVELLING AGENTS IN COATING COMPOSITIONS

(75) Inventors: Bernd Gobelt, Wesel (DE); Alfred Bubat, Wesel (DE); Albert Frank, Xanten (DE); Karlheinz Haubennestel, Wesel (DE)

(73) Assignee: BYK-Chemie GmbH, Wesel (DE)

( * ) Notice: Subject to any disclaimer, the term of this patent is extended or adjusted under 35 U.S.C. 154(b) by 229 days.

(21) Appl. No.: 10/465,536

(22) Filed: Jun. 19, 2003

(65) Prior Publication Data

US 2004/0054071 A1 Mar. 18, 2004

(30) Foreign Application Priority Data

Jun. 19, 2002 (DE) ................. 102 27 338

(51) Int. Cl.
*C08L 83/02* (2006.01)
(52) U.S. Cl. .............. 525/100; 525/476; 525/446; 525/934; 525/474; 526/279
(58) Field of Classification Search ........... 525/100, 525/106, 476, 446, 934, 474; 526/279
See application file for complete search history.

(56) References Cited

U.S. PATENT DOCUMENTS

| | | | | |
|---|---|---|---|---|
| 3,674,891 | A * | 7/1972 | Wheeler, Jr. ............ | 525/263 |
| 3,691,257 | A * | 9/1972 | Kendrick et al. ........ | 525/90 |
| 4,584,337 | A * | 4/1986 | Lee et al. .............. | 524/500 |
| 4,728,571 | A * | 3/1988 | Clemens et al. ........ | 428/352 |
| 4,812,518 | A | 3/1989 | Haubennestel et al. .. | 525/100 |
| 5,735,944 | A | 4/1998 | Haubennestel et al. .. | 106/272 |
| 5,789,487 | A * | 8/1998 | Matyjaszewski et al. | 525/301 |
| 6,093,410 | A * | 7/2000 | Peffly et al. ........... | 424/401 |
| 6,153,705 | A | 11/2000 | Copart et al. .......... | 525/244 |
| 6,197,883 | B1 | 3/2001 | Schimmel et al. ...... | 525/111 |
| 6,207,782 | B1 * | 3/2001 | Czech et al. ........... | 528/26 |
| 6,503,313 | B2 * | 1/2003 | Matakawa et al. ...... | 106/287.1 |
| 6,534,185 | B1 * | 3/2003 | Baumgart et al. ....... | 428/447 |
| 6,541,109 | B1 * | 4/2003 | Kumar et al. .......... | 428/352 |
| 6,610,765 | B1 * | 8/2003 | Pfaendner et al. ...... | 524/108 |
| 6,630,522 | B2 * | 10/2003 | Kawase et al. ......... | 523/161 |
| 6,642,335 | B2 * | 11/2003 | Kawase et al. ......... | 526/279 |
| 6,710,127 | B2 * | 3/2004 | Haubennestel et al. .. | 525/64 |
| 2002/0143087 | A1 | 10/2002 | Haubennestel et al. .. | 524/379 |

FOREIGN PATENT DOCUMENTS

| | | |
|---|---|---|
| EP | 1 193 299 | 3/2002 |
| WO | WO-96/30421 | 10/1996 |
| WO | WO-98/01478 | 1/1998 |
| WO | WO-98/01480 | 1/1998 |
| WO | WO-99/31144 | 6/1999 |
| WO | WO-00/71606 | 11/2000 |
| WO | WO-02/08307 | 1/2002 |

OTHER PUBLICATIONS

Brown, D. A., et al., "Preparation and thermal properties of block copolymers of PDMS with styrene or methyl methacrylate using ATRP", *Polymer*, 42(10), (2001), 4767-4771.

Houben-Weyl, "aus Carbonsaure-chloriden", *Methoden der Oranischen Chemie, Band E5*, S., 695 ff.

Huan, Kim , et al., "Synthesis and Properties of Polydimethylsiloxane-Containing Block Copolymers via Living Radical Polymerization", *Journal of Polymer Science: Part A: Polymer Chemistry*, 39(11), (2001), 1833-1842.

Lutsen, Laurence , et al., "Poly(methylphenylsilylene)-Block-Polystyrene Copolymer Prepared by the use of a Chloromethylphenyl End-Capped Poly(Methylphenylsilylene) as a Macromolecular Initiator in an Atom Transfer Radical Polymerization of Styrene", *Eur. Polym. J.*, vol. 34, No. 12, (1998), 1829-1837.

Matyjaszewski, Krzysztof , "Atom Transfer Radical Polymerization", *Chemical Reviews*, vol. 101, (2001), 2921-2990.

Miller, Peter J., et al., "Atom Transfer Radical Polymerization of (Meth)acrylates from Poly(dimethylsiloxane) Macroinitiators", *Macromolecules*, 32(26), (1999), 8760-8767.

Nakagawa, Yoshiki , et al., "Development of novel attachable initiators for atom transfer radical polymerization. Synthesis of block and graft copolymers from poly(dimethylsiloxane) macroinitiators", *Polymer*, vol. 39, No. 21, (1998), 5163-5170.

Saam, John C., et al., "Preparation of 3-Triethoxysilylpropylamine and 1,3-Bis(3-aminopropyl)tetramethyldisiloxane", *Journal of Organic Chemistry*, vol. 24, (1959), 119-121.

* cited by examiner

*Primary Examiner*—Margaret G. Moore
(74) *Attorney, Agent, or Firm*—Schwegman, Lundberg, Woessner and Kluth P.A.

(57) ABSTRACT

The invention relates to the use of block copolymers as leveling agents for surface coatings, having a weight-average molecular weight of from 1000 to 100000. The leveling agent is a linear or branched block copolymer composed of a polysiloxane block and one or more blocks prepared from ethylenically unsaturated monomers by controlled free-radical addition polymerization.

The invention also relates to coating compositions which comprise the leveling agent.

19 Claims, No Drawings

USE OF POLYACRYLATE-MODIFIED POLYSILOXANES AS LEVELLING AGENTS IN COATING COMPOSITIONS

CROSS-REFERENCE TO RELATED APPLICATION

This application claims priority from German patent application No. DE 102 27 338.3, Filed: Jun. 19, 2002, which is incorporated herein by reference.

FIELD OF THE INVENTION

The invention relates to the use of block copolymers as leveling agents for coating compositions. The invention further relates to coating compositions which comprise the block copolymers as leveling agents.

By coating compositions are meant all compositions suitable for use for the coating of surfaces. The term refers in particular to surface coating materials which may be present in liquid form or as powder coating materials. The liquid coating materials may be solutions and/or dispersions of binders and, where appropriate, pigments and also auxiliaries in organic solvents, water or mixtures of solvents and water.

Paint surfaces are normally not entirely smooth but instead have a more or less structured surface referred to as waviness or else as orange peel. These surfaces may be finely structured, with a short wave, or coarsely structured, with a long wave. In the majority of cases this waviness is unwanted. The structure depends on the nature and composition of the coating compositions, for example on whether these coating compositions comprise solvents or else are solvent-free, as in the case of powder coating materials. In the case of powder coating materials it is absolutely necessary to add leveling agents, since without these leveling agents it is impossible to achieve a surface which is to any extent smooth.

It is known that poly(meth)acrylic esters and polysiloxanes can be used as leveling promoters for coatings.

The polysiloxanes are generally polydimethylsiloxanes, polymethylalkylsiloxanes or else polyether- or polyester-modified polydimethyl- or polymethylalkyl-siloxanes.

In the case of the poly(meth)acrylates it is preferred to use polymers or copolymers of acrylic acid alkyl esters having an alkyl radical chain length of $C_2$–$C_{12}$, such as ethyl acrylate, n-butyl acrylate, 2-ethylhexyl acrylate or else lauryl acrylate, for example, acrylates and methacrylates being encompassed by the written form (meth)acrylates. The products used possess in some cases molecular weights of up to 100,000 g/mol. U.S. Pat. No. 6,197,883 describes the use of block copolymers as leveling promoters ("flow improvers").

These poly(meth)acrylate (co)polymers used as leveling promoters may be employed as such or as solutions in organic solvents, or else as powders applied to silica, for example. This is normally the case particularly when they are used in powder coating materials. The amounts of such products that are used are usually from 0.1 to 2% by weight, based on the coating formulations.

The action of these leveling promoters is based on an activity at the liquid/gas interface, to which these products are oriented owing to a certain incompatibility with the actual binder of the coating system. This incompatibility may be increased by raising the molecular weight of these polymers. Disadvantages which then arise, however, are that, owing to this incompatibility, there may be a certain clouding of the coating and that the viscosity of the leveling agent becomes so high that handling for the user becomes very difficult if not impossible. Moreover, polysiloxanes display a tendency towards severe incompatibilities with the coating material, a phenomenon which is manifested, for example, in cratering in the coating film. This imposes limits on the use of polysiloxanes and more particularly on the amount in which they are employed. Nevertheless, they are frequently employed in combination with poly(meth)acrylic esters, since in addition to their leveling promotion properties they lower the surface tension of the coating material and therefore assist the wetting of the substrate by the coating material.

The existing polymers provided only an inadequate solution to the abovementioned problem, and there is an urgent need for new agents which promote both leveling and substrate wetting and which allow absolutely smooth coating films to be produced.

Surprisingly it has been found that these objectives can be achieved by adding block copolymers consisting of a polysiloxane main chain and one or more blocks prepared from ethylenically unsaturated monomers preferably by controlled free-radical addition polymerization as leveling agents to the surface coatings. In addition to their flow promotion properties these compounds promote the wetting of substrates by lowering the surface tension, so that it is possible to do without the additional use of polysiloxanes.

The invention accordingly provides for the use of block copolymers which are composed of a polysiloxane main chain and at least one block of addition-polymerized unsaturated monomers and are obtainable by reacting at least one polysiloxane-containing prepolymer containing at least one transferable group with ethylenically unsaturated monomers as leveling agents for coating compositions.

Advantageous embodiments of the present invention are evident from the subclaims.

The addition polymerization processes which are used and can be used to prepare the leveling agents of the invention are as follows:

a) controlled free-radical polymerization with xanthogenic esters as transfer agents, as described for example in WO 98/58974, b) controlled free-radical polymerization with dithioesters as transfer agents, as described for example in WO 98/01478, c) controlled free-radical polymerization with dithiocarbamates as transfer agents, as described for example in WO 99/31144, d) atom transfer radical polymerization (ATRP), as described for example in WO 96/30421 or in *Chem. Rev.* 2001, 101, 2921.

In the text below the polymerization processes a)–c) are referred to as RAFT polymerizations.

The preferred polymerization process for preparing the block copolymers from organically modified polysiloxanes is that of atom transfer radical polymerization.

The preparation of block copolymers from organically modified polysiloxanes which carry transferable groups by chain extension with styrene or (meth)acrylates by means of ATRP has been described in:

Y. Nakagawa, P. J. Miller, K. Matyjaszewski, *Polymer* 1998, 39, 5163–5170.

L. Lutsen, G. P.-G. Cordina, R. G. Jones, F. Schue, *Eur. Polym. J.* 1998, 34, 1829–1837.

P. J. Miller, K. Matyjaszewski, *Macromolecules* 1999, 32, 8760–8767.

D. A. Brown, G. J. Price, *Polymer* 2001, 42, 476–4771.

K. Huan, L. Bes, D. M. Haddleton, E. Khoshdel, *J. Polym. Sci., Part A: Polym. Chem.* 2001, 39, 1833–1842.

WO 98/01480.

WO 00/71606.

The preparation of block copolymers from organically modified polysiloxanes which carry transferable groups by chain extension with (meth)acrylates and vinyl esters by means of RAFT polymerization has been described in WO 02/08307.

For the preparation of the polymers for use in accordance with the invention as leveling agents a polysiloxane-containing macroinitiator having at least one transferable group is prepared and in the presence of this macroinitiator ethylenically unsaturated monomeric units are subjected to controlled free-radical polymerization.

Polysiloxane-containing macroinitiators are referred to below as polysiloxane-containing prepolymers. The polymer chains chemically bonded to these polysiloxane-containing prepolymers are referred to below as side chains.

The polysiloxane-containing prepolymers which are reacted by ATRP to give the leveling agents of the invention can be prepared as follows:

The polysiloxane-containing prepolymer is prepared starting from terminally and/or laterally H-terminated polysiloxanes in a single-stage or multi-stage reaction sequence.

In the single-stage reaction the terminally and/or laterally H-terminated polysiloxane is reacted with monoallyl- or monovinyl-bearing molecules which carry a transferable group, such as vinylbenzyl chloride or allyl 2-bromoisobutyrate, for example, by known processes, which are described for example in *Macromolecules* 1999, 32, 8760–8767.

In the multi-stage reaction sequence the terminally and/or laterally H-terminated polysiloxanes are reacted with hydroxyl-bearing unsaturated compounds by known processes, as described for example in U.S. Pat. No. 2,924,588. Examples of suitable hydroxyl-bearing unsaturated compounds include allyl alcohol, 5-hexenol, ethylene glycol monoallyl ether, monoallyl- or monovinyl-terminated polyethylene glycols, polypropylene glycols or mixed polyethylene/propylene glycols.

Furthermore, it is possible to react these now OH-terminated polysiloxane-containing polymers with lactones, such as valerolactone or caprolactone, for example, to give OH-terminated polysiloxane-containing block copolymers by known processes, as described for example in DE-A-3535283.

These OH-terminated polysiloxane-containing polymers and block copolymers can be reacted with 2-halocarboxylic acids (such as 2-bromopropionic acid, 2-bromoisobutyric acid, 2-chloropropionic acid or 2-chloroisobutyric acid), 2-halocarboxylic esters (such as methyl 2-bromopropionate, ethyl 2-bromoisobutyrate, methyl 2-chloropropionate or ethyl 2-chloroisobutyrate), or 2-halocarbonyl halides (such as 2-bromopropionyl bromide, 2-bromoisobutyryl bromide, 2-chloropropionyl chloride or 2-chloroisobutyryl chloride) by known processes to give the polysiloxane-containing prepolymers. Processes of this kind are described for example in Houben-Weyl: "Methoden der Organischen Chemie", Volume E5, p. 695 ff.

It is known that protected and unprotected unsaturated amines such as allylamine can also be subjected to addition reaction with terminally and/or laterally H-terminated polysiloxanes. This is described for example by van Saam and Speier in *J. Org. Chem.* 1959, 24, 119. These compounds can be reacted in the same way as the OH-terminated polysiloxanes to give polysiloxane-containing prepolymers.

The preparation of the polysiloxane-containing prepolymers which are reacted by means of RAFT polymerizations to give the leveling agents of the invention is described in WO 02/08307 starting from OH-terminated polysiloxane-containing polymers.

For the use of polysiloxane-containing block copolymers instead of the polysiloxane-containing polymers the comments made above apply.

The polysiloxane-containing prepolymers can be linear, comblike or branched. Preference is given to linear or comblike polysiloxane-containing prepolymers.

Free-radically polymerizable monomeric units are selected from the group consisting of:

alkyl (meth)acrylates of straight-chain, branched or cycloaliphatic alcohols having 1 to 22 carbon atoms, such as, for example, methyl (meth)acrylate, ethyl (meth)acrylate, n-butyl (meth)acrylate, isobutyl (meth)acrylate, t-butyl (meth)acrylate, lauryl (meth)acrylate, 2-ethylhexyl (meth)acrylate, stearyl (meth)acrylate, behenyl (meth)acrylate, cyclohexyl (meth)acrylate, isobornyl (meth)acrylate;

aryl (meth)acrylates, such as, for example, benzyl methacrylate or phenyl acrylate, it being possible for the aryl radicals in each case to be unsubstituted or substituted up to four times.

Furthermore, monomeric units having functional groups can be used, in order to allow subsequent attachment to the respective polymeric matrix or the binder. Thus as monomeric units having functional groups it is possible for example to use acrylic acid, methacrylic acid and also hydroxyalkyl (meth)acrylates of straight-chain, branched or cycloaliphatic diols having 2 to 36 carbon atoms, such as, for example, 3-hydroxypropyl methacrylate, 3,4-dihydroxybutyl monomethacrylate, 2-hydroxyethyl (meth)acrylate, 4-hydroxybutyl (meth)acrylate, 2-hydroxypropyl methacrylate, 2,5-dimethyl-1,6-hexanediol monomethacrylate and 1,10-decanediol monomethacrylate;

as monomeric units it is also possible to use ether alcohol-containing and polyethylene-glycol-containing monomeric units in order to allow the branched polymers of the invention to be soluble in water or emulsifiable in water. It is possible to use mono(meth)acrylates of ethers, polyethylene glycols, polypropylene glycols or mixed polyethylene/propylene glycols having 5 to 80 carbon atoms, such as for example tetrahydrofurfuryl methacrylate, methoxyethoxyethyl methacrylate, 1-butoxypropyl methacrylate, 1-methyl-2-(vinyloxy)ethyl methacrylate, cyclohexyloxymethyl methacrylate, methoxyethyl methacrylate, benzyloxymethyl methacrylate, furfuryl methacrylate, 2-butoxyethyl methacrylate, 2-ethoxyethyl methacrylate, allyloxymethyl methacrylate, 1-ethoxybutyl methacrylate, methoxymethyl methacrylate, 1-ethoxyethyl methacrylate, ethoxymethyl methacrylate, poly(ethylene glycol) methyl ether (meth)acrylate, poly(propylene glycol) methyl ether (meth)acrylate;

in order to allow crosslinking of the hydroxy-functional leveling agents of the invention with, for example, acrylic-melamine formaldehyde resins it is also possible to react some or all of these hydroxyl groups with isocyanates to form secondary carbamate groups, so that during the crosslinking of the overall system the leveling agent is left with sufficient time to undergo orientation at the interface, to develop its action there, and, after a certain time delay, to react with the melamine-formaldehyde resin.

It is also possible to incorporate polyesters in the form of caprolactone- and/or valerolactone-modified monomeric units into the polymeric base molecule. Preference is given to using caprolactone- and valerolactone-modified hydroxyalkyl (meth)acrylates having an average molecular weight of from 220 g/mol to 1200 g/mol, the hydroxy(meth)acrylates being derived preferably from straight-chain, branched or cycloaliphatic diols having 2 to 8 carbon atoms.

Further free-radically polymerizable monomeric units are selected for example from the group consisting of (meth)acrylates of halogenated alcohols, such as perfluoroalkyl (meth)acrylates having 6 to 20 carbon atoms;

oxiranyl (meth)acrylates such as 2,3-epoxybutyl methacrylate, 3,4-epoxybutyl methacrylate, 10,11-epoxy-undecyl methacrylate, 2,3-epoxycyclohexyl methacrylate; glycidyl methacrylate;

vinyl esters, such as vinyl acetate;

styrene and substituted styrenes, such as p-methylstyrene.

Preferred monomeric units are selected from the group consisting of acrylic acid, methacrylic acid, methyl acrylate, methyl methacrylate, ethyl acrylate, ethyl methacrylate, n-butyl acrylate, n-butyl methacrylate, isobutyl acrylate, isobutyl methacrylate, t-butyl acrylate, t-butyl methacrylate, lauryl acrylate, lauryl methacrylate, 2-ethylhexyl acrylate, 2-ethylhexyl methacrylate, stearyl acrylate, stearyl methacrylate, behenyl acrylate, behenyl methacrylate, cyclohexyl acrylate, cyclohexyl methacrylate, isobornyl acrylate, isobornyl methacrylate, hydroxyethyl acrylate, hydroxyethyl methacrylate, styrene, acrylonitrile, triethylene glycol monoacrylate, triethylene glycol monomethacrylate, polyethylene glycol monoacrylate, polyethylene glycol monomethacrylate, and also caprolactone-modified hydroxyethyl acrylate, valerolactone-modified hydroxyethyl acrylate, caprolactone-modified hydroxyethyl methacrylate and valerolactone-modified hydroxyethyl methacrylate having a molecular weight of between 220 g/mol and 1200 g/mol or mixtures thereof.

These compounds can be used individually or as mixtures, depending on the desired binder compatibility. These components can be added simultaneously or sequentially to a reaction mixture in order to obtain polymers for use in accordance with the invention. Depending on the nature of the addition the products are polysiloxane-containing polymers whose side chains, which have been prepared from ethylenically unsaturated monomers, can be regarded as random copolymers, gradient copolymers, comb copolymers or block copolymers.

In order to obtain random copolymer side chains it is common to start from mixtures which contain all of the monomers to be polymerized. Also conceivable is the continuous or batchwise addition of monomer mixtures, in which case their composition is generally kept constant over the period of the addition in order to ensure a random distribution of the individual units in the copolymer.

Besides random copolymer side chains, the process of the present invention can also be used to give gradient copolymer and block copolymer side chains, by varying the composition of the monomers, i.e. the relative concentration of the different monomers to one another, during the polymerization.

Block copolymer side chains can be obtained by adding, batchwise, different monomers or mixtures of monomers to the reaction mixture. In this case account should be taken of the living character of controlled free-radical polymerization processes, so that the reaction can be interrupted over a relatively long period of time between the addition of the different monomers and/or mixtures of monomers. A similar result can also be achieved by producing a jump discontinuity in the compositions of the monomers at defined points in time during their continuous addition.

Gradient copolymer side chains are copolymers composed, for example, of two monomers, A and B, in whose individual chains there is a gradient in the distribution of the monomeric units along the chains. One chain end is rich in A units and the other chain end is rich in B units. These polymers are easy to prepare by controlled free-radical polymerization processes, since they have a living character. Accordingly, gradient copolymer side chains can be obtained by continuously varying the monomer mixture added during the polymerization.

The molecular weights $M_n$ of the polymers of the invention lie in the range from about 1000 g/mol to about 100,000 g/mol, preferably from about 2000 g/mol to about 50,000 g/mol, more preferably from about 2000 g/mol to about 20,000 g/mol.

The polysiloxane-containing prepolymer advantageously has a molecular weight $M_n$ from about 500 g/mol to about 50,000 g/mol, preferably from about 500 g/mol to about 10,000 g/mol.

The weight fraction of the polysiloxane units based on the total weight of the block copolymer is advantageously from 2 to 50 percent by weight, preferably from 2 to 20 percent by weight.

The polymers can also be subsequently modified by means of polymer-analogous reaction. For example, by reacting a polymer containing hydroxy-functional monomeric units in its base molecule with maleic anhydride it is possible to incorporate a reactive double bond and acid function. Further suitable anhydrides for introducing the acid function include for example succinic anhydride and phthalic anhydride, and hydroxy-functional monomeric units within a polymer may also be esterified with structurally different anhydrides. For better water solubility, the acid function can also be converted to its salt form with alkanolamines, for example. Moreover, by subsequent acrylating and/or methacrylating on the hydroxyl group, products can be obtained which are firmly incorporable into coating systems even in the case of radiation cure processes, such as UV and electron beam curing.

The leveling agents of the invention are used in the coating formulations in relatively small amounts of from about 0.01 to about 5% by weight, preferably from about 0.05 to about 2% by weight, most preferably from about 0.1 to about 1% by weight.

The leveling agents of the invention can be used as solutions, as emulsions or in 100% form, depending on the nature of the coating material and the manner of its application.

In solvent-borne coating materials it is preferred to use leveling agents whose solvents are similar to those of the coating materials themselves. In radiation-curing systems the leveling agents are dissolved preferably in corresponding monomers. In powder coating materials preference is given to a 100% form of the leveling agent or to a form thereof which is applied to pulverulent carrier material. These leveling agents can also be incorporated, as in German Patent Application DE-A 195 22 475, into wax melts and so converted into free-flowing solid forms, if the leveling agents of the invention are viscous, tacky resins. In aqueous powder slurries, a powder coating modification, the leveling agents can be added as an aqueous emulsion. These emulsions are prepared in accordance with the prior art with the aid of emulsifiers.

The invention also relates to coating compositions which comprise the leveling agent of the invention in a concentration of from 0.01 to 5% by weight, preferably from 0.05 to 2% by weight, more preferably from 0.1 to 1% by weight.

PREPARATION EXAMPLES

The invention is further illustrated by the following examples.

The OH-functional polysiloxane-containing polymers and block copolymers used are summarized and elucidated in Table 1.

B) General preparation of the polymers of the invention with reference to polymer P2 by means of ATRP In a glass flask provided with stirrer, thermometer, reflux condenser and nitrogen inlet tube 20 g of the polysiloxane-containing prepolymer M1 were reacted under nitrogen with 25 g of xylene, 80 g of n-butyl acrylate, 200 mg of CuBr and 0.3 ml of N,N,N',N'',N''-pentamethyldiethylenetriamine at approximately 80° C. for about five hours. After the reaction mixture had been diluted with 180 g of xylene it was filtered over silica gel in order to separate off impurities. Subsequently the remaining solution was reacted with 0.5 g of AIBN at 90° C. for two hours. The average molecular weight was determined by means of gel permeation chromatography, using polymethyl methacrylate as the standard for comparison, to be about 6300 g/mol.

TABLE 1

OH-functional polysiloxane-containing polymers and block copolymers $R^{11}$—$SiMe_2$—O—$[(SiMeR^{12}O)_x$—$(SiMe_2O)_y)]_z$—$SiMe_2$—$R^{13}$

| Polymer | $R^{11}$ | $R^{12}$ | $R^{13}$ | x | y | z | $M_n$ (g/mol) | Polysiloxane % by wt | Polycaprolactone % by wt | OH number |
|---|---|---|---|---|---|---|---|---|---|---|
| SOH1 | —$(CH_2)_3OH$ | — | —$(CH_2)_3OH$ | 0 | 14 | 1 | 1100 | 100 | 0 | 99.8 |
| SOH2 | —$(CH_2)_3OH^a$ | — | —$(CH_2)_3OH^a$ | 0 | 14 | 1 | 2500 | 43.5 | 56.5 | 39.3 |
| SOH3 | $CH_3$ | —$(CH_2)_3OH$ | $CH_3$ | 1 | 16 | 5 | 6700 | 100 | 0 | 31.3 |
| SOH4 | $CH_3$ | —$(CH_2)_3OH^b$ | $CH_3$ | 1 | 16 | 5 | 11,900 | 58 | 42 | 22.5 |
| SOH5 | —$(CH_2)_3OH$ | — | $CH_3$ | 0 | 24 | 1 | 2000 | 100 | 0 | 19.8 |

[a]OH group esterified with a polyester formed from 6 mol of ε-caprolactone per mole of OH group
[b]OH group esterified with a polyester formed from 8 mol of ε-caprolactone per mole of OH group A) Preparation examples for the polysiloxane-containing prepolymers reacted by means of ATRP to give the leveling agents of the invention, with reference to M1

In a glass flask provided with stirrer, thermometer and reflux condenser 50 g of the terminally difunctional polysiloxane SOH1 were mixed with 50 g of xylene and 11 g of dimethylcyclohexylamine and with stirring 20.5 g of α-bromoisobutyryl bromide (BiB) were added dropwise. 30 minutes after the end of the dropwise addition procedure the batch was filtered over silica gel and all of the volatile constituents were removed by distillation.

The conversion was determined from $^1H$ and $^{13}C$ NMR spectra to be 93%.

The other examples listed in Table 2 were prepared in analogy to this example.

TABLE 2

Polysiloxane-containing prepolymers

| Polysiloxane-containing prepolymer | SOH | SOH:BiB [g] | Conversion |
|---|---|---|---|
| M1 | SOH1 | 50:20.5 | 93% |
| M2 | SOH2 | 121:20.7 | 90% |
| M3 | SOH3 | 47.5:6.1 | 70% |
| M4 | SOH4 | 100:9.3 | 75% |
| M5 | SOH5 | 138:11.3 | 84% |

The other examples listed in Table 3 were prepared in analogy to this example.

Key to the definitions:

| Key to the definitions: | |
|---|---|
| BA = | n-butyl acrylate |
| BM = | n-butyl methacrylate |
| EH = | 2-ethylhexyl acrylate |
| LA = | lauryl acrylate |
| TEOMA = | ethyltriethylene glycol methacrylate |
| AIBN = | 2,2-azobis(isobutyronitrile) |

TABLE 3

Reaction products of the polysiloxane-containing prepolymers

| Polymer | Macro initiator | Monomer | Macro initiator: monomer [g] | Form | $M_n$ (g/mol) | $M_w/M_n$ |
|---|---|---|---|---|---|---|
| P1 | M1 | BA | 20:30 | linear | 3000 | 1.3 |
| P2 | M1 | BA | 10:40 | linear | 6300 | 1.4 |
| P3 | M1 | BA/BMA 5:1 | 10:40 | linear | 6100 | 1.3 |
| P4 | M1 | BA/EHA 1:1 | 10:40 | linear | 6500 | 1.3 |
| P5 | M1 | BA/LA 10:1 | 10:40 | linear | 7200 | 1.5 |
| P6 | M1 | BA/TEOMA 10:1 | 10:40 | linear | 6600 | 1.3 |
| P7 | M1 | BA:Styrene 10:1 | 10:40 | linear | 8700 | 1.6 |

TABLE 3-continued

Reaction products of the polysiloxane-containing prepolymers

| Polymer | Macro initiator | Monomer | Macro initiator: monomer [g] | Form | $M_n$ (g/mol) | $M_w/M_n$ |
|---|---|---|---|---|---|---|
| P8 | M1 | BA | 10:80 | linear | 9100 | 1.6 |
| P9 | M2 | BA | 20:35 | linear | 5300 | 1.6 |
| P10 | M2 | BA | 20:70 | linear | 8200 | 1.6 |
| P11 | M3 | BA | 10:80 | comb | 8800 | 5.7 |
| P12 | M4 | BA | 10:46 | comb | 9200 | 21.1 |
| P13 | M5 | BA | 10:40 | linear | 17800 | 1.4 |
| P14 | M5 | BA | 10:80 | linear | 29700 | 1.3 |

C) Preparation examples for the polysiloxane-containing prepolymer M6 reacted by means of a RAFT polymerization to give the leveling agent of the invention.

In a glass flask provided with stirrer, thermometer and reflux condenser 50 g of SOH1 were mixed with 50 g of xylene and 11 g of dimethylcyclohexylamine and with stirring 19.3 g of α-bromopropionyl bromide were added dropwise. 30 minutes after the end of the dropwise addition procedure the batch was filtered over silica gel and all of the volatile constituents were removed by distillation. The conversion was determined on the basis of $^1$H and $^{13}$C NMR spectra to be 97%. 20 g of this oil in 400 ml of acetonitrile were reacted with 11.4 g of potassium ethyl xanthogenate at room temperature for two hours. Thereafter the acetonitrile was replaced by 400 ml of diethyl ether and the ethereal liquid was filtered. Following removal of the ether by distillation the conversion was determined by $^1$H NMR spectroscopy to be 74%.

D) Preparation of the polymer P15 of the invention by means of RAFT polymerization 10 g of M6, 80 g of n-butyl acrylate and 0.25 g of AIBN were heated in 40 g of xylene at 80° C. for 8 hours. The average molecular weight was determined by gel permeation chromatography, using polymethyl methacrylate as the standard for comparison, to be about 10300 g/mol: $M_w/M_n$=1.5.

The performance testing of the polymers took place by application in a powder coating material and in a conventional solvent-borne varnish.

Results for Solvent-Borne Acrylate/Melamine Baking Varnish

Test system: acrylate-melamine baking varnish, clear

| Composition: | |
|---|---|
| Setalux 1760 VB 64 | 44.0% |
| Setalux C 91389 VX 45 | 16.5% |
| Luwipal 018 | 25.3% |
| Butyldiglycol acetate | 2.1% |
| Solvesso 150 | 4.8% |
| Butanol | 6.1% |
| Butyldiglycol | 1.2% |
| mix, then add | |
| Butanol | 8.0% |
| Solvesso 150 | 3.8% |
| Butyldiglycol | 1.8% |

Setalux 1760 VB 64 = acrylate baking resin from Akzo Nobel Resins, Bergen op Zoom
Setalux C 91389 VX 45 = acrylate baking resin from Akzo Nobel Resins, Bergen op Zoom
Luwipal 018 = melamine baking resin, BASF AG, Ludwigshafen The leveling agents were incorporated one day before application. On the day of application the viscosity was adjusted to 24 seconds, DIN 4 mm flow cup, using Solvesso 150. Application was made using automatic sprayers.

Curing was carried out, after a 30-minute flash-off time, at 140° C. in 30 minutes.

Assessment of Leveling:
1=very good to 5=poor

TABLE 4

| Leveling agent | Amount used | Film thickness | Long wave* | Short wave* | Visual assessment |
|---|---|---|---|---|---|
| 0 sample** | — | 40 µm | 45.5 | 73.5 | 5 |
| Modaflow** | 0.1% | 40 µm | 5.5 | 8.4 | 3 |
| Byk 315** | 0.1% | 40 µm | 4.1 | 6.7 | 2 |
| Byk 315/Byk 355** in 1:1 ratio | 0.1% | 40 µm | 3.6 | 6.2 | 2 |
| P2 | 0.1% | 40 µm | 1 | 3.9 | 1 |
| P4 | 0.1% | 40 µm | 1.4 | 3.7 | 1 |
| P5 | 0.1% | 40 µm | 1.7 | 3.9 | 1 |
| P6 | 0.1% | 40 µm | 1.5 | 3.4 | 1 |
| P7 | 0.1% | 40 µm | 1.8 | 4.0 | 1 |
| P8 | 0.1% | 40 µm | 1.4 | 3.6 | 1 |
| P10 | 0.1% | 40 µm | 2.2 | 3.3 | 2 |
| P11 | 0.1% | 40 µm | 3.2 | 2.9 | 2 |
| P12 | 0.1% | 40 µm | 1.7 | 2.9 | 1 |
| P14 | 0.1% | 40 µm | 1.6 | 3.2 | 1 |
| P15 | 0.1% | 40 µm | 1.5 | 3.7 | 1 |

*Measured with the following instrument: wave scan from Byk Gardner
**Comparative examples
Modaflow: Poly(ethyl acrylate/2-ethylhexyl acrylate), Monsanto
Byk 315: Polyester-modified polysiloxane, Byk Chemie
Byk 355: Polybutyl acrylate, Byk Chemie Preparation of a Grey Powder Coating Material

| Composition: | | |
|---|---|---|
| Uralac P5127 | 31.2% | Polyester resin, DSM |
| DER 663 UE | 31.2% | Epoxy resin, Dow |
| Kronos 2160 | 27.15% | Titanium dioxide, Kronos |
| Carbon black FW 200 | 0.1% | Black pigment, Degussa |
| Blanc fixe | 9.9% | Barium sulfate, Sachtleben |
| Benzoin | 0.3% | DSM |
| Leveling agent | 0.15% | see results table |

The leveling agents according to the examples were incorporated in the form of 10% masterbatches in Uralac P5127. This was taken into account in the amount of Uralac P5127 weighed in.

All of the components were weighed in together and premixed in a high-speed mixer at 200 rpm for 2.5 minutes. Thereafter the mixtures were extruded in a twin-screw extruder at 120° C. The resulting resin melt was cooled, fractionated and ground in a pinned-disc mill. The resulting powder was passed through a 100 µm sieve.

The resultant powder coating mixture was then applied electrostatically to phosphated iron panels and the panels thus coated were cured at 190° C. for 12 minutes.

| Result: | | |
|---|---|---|
| Film thickness: | 80–90 µm | 60–70 µm | Reduction in slip resistance as compared with the 0 sample |

-continued

| Result: | | | |
|---|---|---|---|
| 0 sample*, ** | 3 | 3 | |
| Modaflow** | 2 | 3 | no |
| P2 | 1 | 2 | yes |

*Powder coating without leveling agent
**Comparative examples
Evaluation of the surfaces resulting:
1 = crater-free surface
2 = surface with slight cratering
3 = surface with distinct cratering, in some cases down to the substrate The inventive and comparative examples show that through the use of the block copolymers prepared by reacting polysiloxane-containing prepolymers with ethylenically unsaturated monomers significant improvements are achieved in the film surfaces. This is so both in comparison with polyacrylates and polysiloxanes and in comparison with a combination of these leveling agents.

All publications, patents, and patent documents, cited in this application, are herein incorporated by reference, as though individually incorporated by reference.

The invention claimed is:

1. A method for forming a smooth, cured coating on a substrate surface comprising coating the substrate surface with a coating composition comprising a cross-linkable leveling agent; and a surface coating material, allowing the leveling agent to promote coating composition flow, and curing the coating composition; wherein the leveling agent comprises one or more block copolymers comprising a polysiloxane main chain; and at least one block comprising polymerized unsaturated monomers;
the one or more block copolymers are atom transfer radical polymerization products of at least one polysiloxane-containing prepolymer, having at least one terminal transferable group, or at least one lateral transferable group, or a combination thereof, and at least one ethylenically unsaturated monomer, and
wherein each transferable group is a labile halogen bonded to a carbon of the polysiloxane-containing prepolymer and the polysiloxane-containing prepolymer is the reaction product of a polysiloxane having at least one terminal or lateral hydrosilyl group, or a combination thereof, and an olefin compound; and,
wherein the surface coating material is a cross-linkable powder coating or a cross-linkable binder in solution or dispersion.

2. The method of claim 1 wherein the block copolymers are used in an amount of from about 0.05 to about 2% by weight based on the total weight of coating composition.

3. The method of claim 1, wherein the block copolymers are used in an amount of from about 0.1 to about 1% by weight based on the total weight of coating composition.

4. The method of claim 1 wherein the olefin compound is allyl 2-haloisobutyrate, 1-butenyl 2-haloisobutyrate, vinylbenzyl chloride or a 2-halocarboxylic ester of allyl alcohol, 5-hexenol, ethylene glycol monoallyl ether, a monoallyl-terminated polyethylene glycol, a monoallyl-terminated polypropylene glycol, a monoallyl-terminated mixed polyethylene/propylene glycol, a monovinyl-terminated polyethylene glycol, a monovinyl-terminated polypropylene glycol or a monovinyl-terminated mixed polyethylene/propylene glycol.

5. The method of claim 4 wherein the 2-halocarboxylic group of the ester is obtained from a 2-halocarboxylic acid, a methyl or ethyl 2-halocarboxylic ester or a 2-halocarbonyl halide wherein the halide group is chloride, bromide or iodide.

6. The method of claim 5 wherein the 2-halocarboxylic acid is 2-bromopropionic acid, 2-bromoisobutyric acid, 2-chloropropionic acid or 2-chloroisobutyric acid, the 2-halocarboxylic ester is methyl 2-bromopropionate, ethyl 2-bromoisobutyrate, methyl 2-chloropropionate or ethyl 2-chloroisobutyrate), and the 2-halocarbonyl halide is 2-bromopropionyl bromide, 2-bromoisobutyryl bromide, 2-chloropropionyl chloride or 2-chloroisobutyryl chloride.

7. The method of claim 1 wherein the labile halogen is chlorine or bromine.

8. The method of claim 1, wherein the block copolymers have a molecular weight $M_n$ of from 1000 g/mol to 100000 g/mol.

9. The method of claim 1, wherein the polysiloxane-containing prepolymer has a molecular weight $M_n$ of from 500 g/mol to 50000 g/mol.

10. The method of claim 1, wherein the weight fraction of the polysiloxane units based on the overall weight of the block co-polymer is from 2 to 50 per cent by weight.

11. The method of claim 1, wherein the polysiloxane-containing prepolymer is of linear construction.

12. The method of claim 1, wherein the polysiloxane-containing prepolymer is of comblike construction.

13. The method of claim 1, wherein the polysiloxane-containing prepolymer carries polyester-containing and/or polyether-containing side chains.

14. The method of claim 1, wherein the block copolymer comprises blocks of free-radically polymerized monomeric units composed randomly of two or more monomers.

15. The method of claim 1, wherein the block copolymer comprises blocks of free-radically polymerized monomeric units composed in gradient fashion of two or more monomers.

16. The method of claim 1, wherein the block copolymer comprises blocks of free-radically polymerized monomeric units composed in turn in block fashion of two or more monomers.

17. The method of claim 1, wherein the block copolymer is in part the atom transfer radical polymerization product of functional-hydroxyl-group-containing ethylenically unsaturated monomers and the functional hydroxyl groups have been esterified with at least one compound selected from the group consisting of maleic anhydride, succinic anhydride, phthalic anhydride, acrylic acid and methacrylic acid.

18. The method of claim 1, wherein the block copolymer comprises free-radically polymerized units selected from the group of the alkyl acrylates and alkyl methacrylates of straight-chain, branched or cycloaliphatic alcohols having 1 to 22 carbon atoms, aralkyl acrylates and aralkyl methacrylates of aralkyl alcohols having 8 to 18 carbon atoms, polyethylene glycol monoacrylates or polyethylene glycol monomethacrylates having 5 to 80 carbon atoms, hydroxyalkyl monoacrylates and hydroxyalkyl monomethacrylates of straight-chain, branched or cycloaliphatic diols having 2 to 36 carbon atoms, perfluoroalkyl acrylates and perfluoroalkyl methacrylates having 6 to 20 carbon atoms, styrene and substituted styrenes, acrylonitrile, and also caprolactone- and/or valerolactone-modified hydroxyalkyl acrylates and caprolactone- and/or valerolactone-modified hydroxyalkyl methacrylates having an average molecular weight of from 220 g/mol to 1200 glmol, the hydroxyalkyl monoacrylates and the hydroxyalkyl monomethacrylates preferably being derived from straight-chain, branched or cycloaliphatic diols having 2 to 8 carbon atoms.

19. The method of claim 1, wherein the block copolymers are used in an amount of from about 0.01 to about 5% by weight based on the total weight of coating composition.

* * * * *